(12) United States Patent
Low

(10) Patent No.: US 9,383,929 B2
(45) Date of Patent: Jul. 5, 2016

(54) DATA STORING METHOD AND MEMORY CONTROLLER AND MEMORY STORAGE DEVICE USING THE SAME

(71) Applicant: Phison Electronics Corp., Miaoli (TW)

(72) Inventor: Cheng-Long Low, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/930,669

(22) Filed: Nov. 3, 2015

(65) Prior Publication Data

US 2016/0054935 A1 Feb. 25, 2016

Related U.S. Application Data

(62) Division of application No. 13/633,887, filed on Oct. 3, 2012, now Pat. No. 9,223,688.

(30) Foreign Application Priority Data

Aug. 3, 2012 (TW) .............................. 101128084 A

(51) Int. Cl.
*G06F 12/00* (2006.01)
*G06F 3/06* (2006.01)

(52) U.S. Cl.
CPC ............ *G06F 3/0614* (2013.01); *G06F 3/0604* (2013.01); *G06F 3/0631* (2013.01); *G06F 3/0647* (2013.01); *G06F 3/0679* (2013.01)

(58) Field of Classification Search
CPC ...................................................... G06F 12/00
See application file for complete search history.

(56) References Cited

U.S. PATENT DOCUMENTS

| | | | | |
|---|---|---|---|---|
| 5,617,393 A * | 4/1997 | Itami | ...................... | G06F 3/0601 369/53.21 |
| 5,734,816 A * | 3/1998 | Niijima | .................. | G06F 3/0601 365/185.29 |
| 5,983,312 A * | 11/1999 | Komatsu | ................. | G11C 29/76 711/103 |
| 6,130,837 A * | 10/2000 | Yamagami | ............ | G06F 3/0601 365/185.09 |
| 2003/0041210 A1* | 2/2003 | Keays | .................. | G06F 12/0246 711/103 |
| 2003/0149856 A1* | 8/2003 | Cernea | .................. | G06F 3/0614 711/202 |
| 2004/0049627 A1* | 3/2004 | Piau | ...................... | G06F 3/0613 711/103 |
| 2004/0083335 A1* | 4/2004 | Gonzalez | ............ | G06F 12/0246 711/103 |
| 2004/0114431 A1* | 6/2004 | Shona | .................. | G11C 16/102 365/185.11 |
| 2005/0144357 A1* | 6/2005 | Sinclair | ............... | G06F 12/0246 711/103 |

(Continued)

FOREIGN PATENT DOCUMENTS

CN 101399075 4/2009

OTHER PUBLICATIONS

"Office Action of Chinese Counterpart Application", issued on Nov. 3, 2015, p. 1-p. 10.

*Primary Examiner* — Joseph D Torres
(74) *Attorney, Agent, or Firm* — Jianq Chyun IP Office

(57) ABSTRACT

A data storing method for a rewritable non-volatile memory module and a memory controller and a memory storage device using the same are provided. The data storing method includes moving or writing data into a physical erase unit of the rewritable non-volatile memory module and determining whether the physical erase unit contains a dancing bit. The data storing method further includes when the physical erase unit contains the dancing bit, restoring the rewritable non-volatile memory module to the state before the data is moved or moving the data from the physical erase unit to another physical erase unit. Thereby, the data storing method can effectively ensure the reliability of the data.

12 Claims, 13 Drawing Sheets

(56) References Cited

U.S. PATENT DOCUMENTS

| | | | |
|---|---|---|---|
| 2005/0172065 A1* | 8/2005 | Keays | G06F 12/0246 711/103 |
| 2005/0201177 A1* | 9/2005 | Shiraishi | G11C 16/105 365/222 |
| 2009/0172267 A1 | 7/2009 | Oribe et al. | |
| 2009/0244976 A1* | 10/2009 | Kajimoto | G11C 11/5628 365/185.11 |
| 2010/0095055 A1* | 4/2010 | Gorobets | G06F 3/0613 711/103 |
| 2011/0161606 A1* | 6/2011 | Tanaka | G11C 29/28 711/156 |

* cited by examiner

DATA STORING METHOD AND MEMORY CONTROLLER AND MEMORY STORAGE DEVICE USING THE SAME

CROSS-REFERENCE TO RELATED APPLICATION

This is a divisional application of U.S. patent application Ser. No. 13/633,887, filed on Oct. 3, 2012, now allowed, which claims the priority benefit of Taiwan application serial no. 101128084, filed on Aug. 3, 2012. The entirety of each of the above-mentioned patent applications is hereby incorporated by reference herein and made a part of this specification.

BACKGROUND

1. Technology Field

The present invention relates to a data storing method for a rewritable non-volatile memory module and a memory controller and a memory storage device using the same.

2. Description of Related Art

Along with the widespread of digital cameras, cell phones, and MP3 players in recently years, the consumers' demand to storage media has increased drastically. Rewritable non-volatile memory is one of the most adaptable storage media to aforementioned portable electronic devices (for example, notebook computers) due to its many characteristics such as data non-volatility, low power consumption, small volume, non-mechanical structure, and fast access speed. A solid state drive (SSD) is a storage device which uses a flash memory as its storage medium. Thereby, the flash memory industry has become a very important part of the electronic industry in recent years.

NAND flash memories can be categorized into single level cell (SLC) NAND flash memories, multi level cell (MLC) NAND flash memories, and trinary level cell (TLC) NAND flash memories according to the number of bits that would be stored in each memory cell. Each memory cell of a SLC NAND flash memory stores 1-bit data (i.e., "1" and "0"). Each memory cell of a MLC NAND flash memory stores 2-bit data. Each memory cell of a TLC NAND flash memory stores 3-bit data.

In a NAND flash memory, a physical page is composed of several memory cells arranged on the same word line. Since each memory cell of a SLC NAND flash memory stores 1-bit data, in the SLC NAND flash memory, the memory cells arranged on the same word line are corresponding to one physical page.

On the other hand, the floating-gate storage layer of each memory cell in a MLC NAND flash memory can store 2-bit data. Herein each storage state (i.e., "11", "10", "01", and "00") includes a least significant bit (LSB) and a most significant bit (MSB). For example, in each storage state, the first bit from the left is the LSB, and the second bit from the left is the MSB. Thus, the memory cells arranged on the same word line constitute 2 physical pages. Herein the physical page constituted by the LSBs of the memory cells is referred to as a lower physical page, and the physical page constituted by the MSBs of the memory cells is referred to as an upper physical page.

In particular, the write speed of a lower physical page is faster than that of an upper physical page, and when the upper physical page is programmed and an error occurs, data stored in the lower physical page may also be lost.

Similarly, each memory cell in a TLC NAND flash memory can store 3-bit data. Herein each storage state (i. e., "111", "110", "101", "100", "011", "010", "001", and "000") includes a LSB (the first bit from the left), a center significant bit (CSB, the second bit from the left), and a MSB (the third bit from the left). Thus, the memory cells arranged on the same word line constitute 3 physical pages. Herein the physical page constituted by the LSBs of the memory cells is referred to as a lower physical page, the physical page constituted by the CSBs of the memory cells is referred to as a middle physical page, and the physical page constituted by the MSBs of the memory cells is referred to as an upper physical page. In particular, when the memory cells arranged on the same word line are programmed, either only the lower physical pages or all the lower physical pages, the middle physical pages, and the upper physical pages are programmed to prevent data loss.

Thereby, how to ensure the accuracy of data stored in a flash memory is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data storing method and a memory controller and a memory storage device using the same, in which the reliability and accuracy of data is effectively ensured.

An exemplary embodiment of the present invention provides a data storing method adapted to a memory storage device. The memory storage device has a rewritable non-volatile memory module. The rewritable non-volatile memory module has a plurality of physical erase units. Each of the physical erase units has a plurality of physical program units. A plurality of logical addresses is configured to map a part of the physical erase units. The data storing method includes selecting a first logical address among the logical addresses. Herein the first logical address is mapped to a plurality of physical erase units among the physical erase units. The data storing method also includes selecting a first physical erase unit among the physical erase units, moving valid data belonging to the first logical address from the physical erase units mapped to the first logical address into the first physical erase unit, and determining whether the first physical erase unit contains a dancing bit. The data storing method further includes executing an erasing operation on the first physical erase unit when the first physical erase unit contains the dancing bit.

An exemplary embodiment of the present invention provides a memory controller for controlling a rewritable non-volatile memory module in a memory storage device. The rewritable non-volatile memory module has a plurality of physical erase units, and each of the physical erase units has a plurality of physical program units. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit configures a plurality of logical addresses to map to a part of the physical erase units. The memory management circuit also selects a first logical address among the logical addresses. Herein the first logical address is mapped to a plurality of physical erase units among the physical erase units. The memory management circuit further selects a first physical erase unit among the physical erase units, moves valid data belonging to the first logical address from the physical erase units mapped to the first logical address into the first physical erase unit, and determines whether the first physical erase unit contains a dancing bit. When the first physical erase unit contains the dancing bit, the memory management circuit executes an erasing operation on the first physical erase unit.

An exemplary embodiment of the present invention provides a memory storage device including a connector, a rewritable non-volatile memory module, and a memory controller. The connector is configured to couple to a host system. The rewritable non-volatile memory module has a plurality of physical erase units, and each of the physical erase units has a plurality of physical program units. The memory controller is coupled to the connector and the rewritable non-volatile memory module. The memory controller configures a plurality of logical addresses to map to a part of the physical erase units. The memory controller also selects a first logical address among the logical addresses. Herein the first logical address is mapped to a plurality of physical erase units among the physical erase units. The memory controller further selects a first physical erase unit among the physical erase units, moves valid data belonging to the first logical address from the physical erase units mapped to the first logical address into the first physical erase unit, and determines whether the first physical erase unit contains a dancing bit. When the first physical erase unit contains the dancing bit, the memory controller executes an erasing operation on the first physical erase unit.

An exemplary embodiment of the present invention provides a data storing method for a rewritable non-volatile memory module. The rewritable non-volatile memory module has a plurality of physical erase units. Each of the physical erase units has a plurality of physical program units. The physical erase units are grouped into at least a system area. The data storing method includes writing system data into a first physical erase unit in the system area, determining whether the first physical erase unit contains a dancing bit, and when the first physical erase unit contains a dancing bit, selecting a second physical erase unit and writing the system data into the second physical erase unit.

As described above, exemplary embodiments of the present invention provides a data storing method, a memory controller, and a memory storage device, in which the reliability of stored data is effectively ensured and data loss is prevented.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
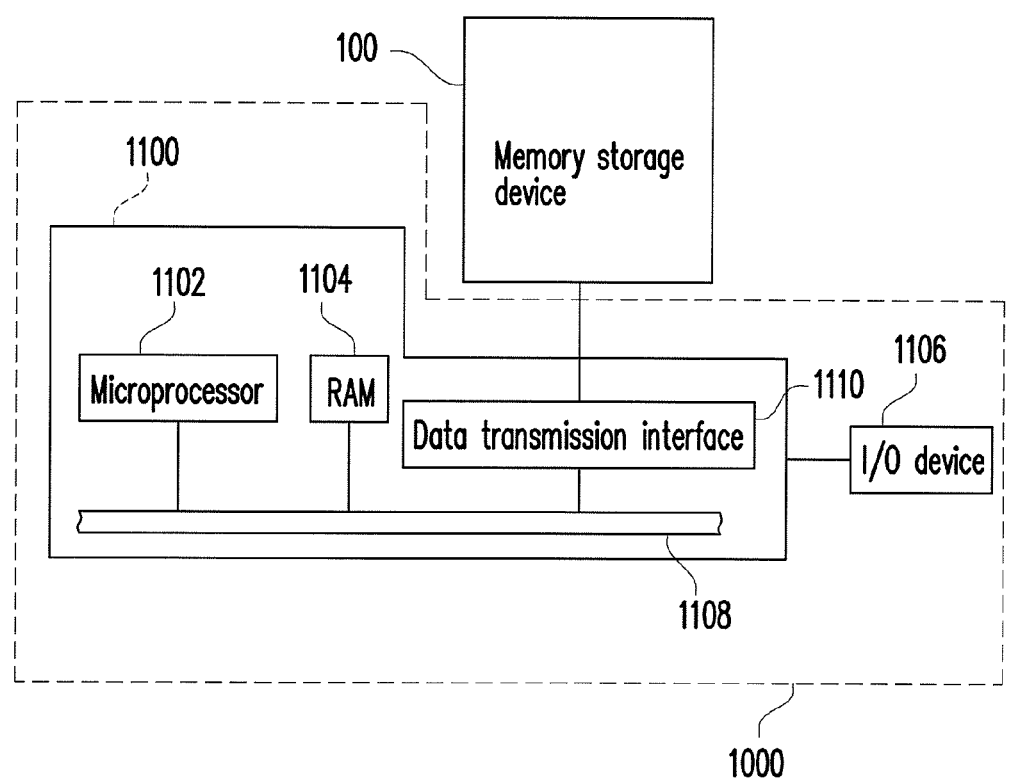
FIG. 1 illustrates a host system and a memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a rewritable non-volatile memory module and a controller (also referred to as a control circuit). A memory storage device is usually used with a host system so that the host system can write data into or read data from the memory storage device.

FIG. 1 illustrates a host system and a memory storage device according to an exemplary embodiment of the invention.

Figure 2:
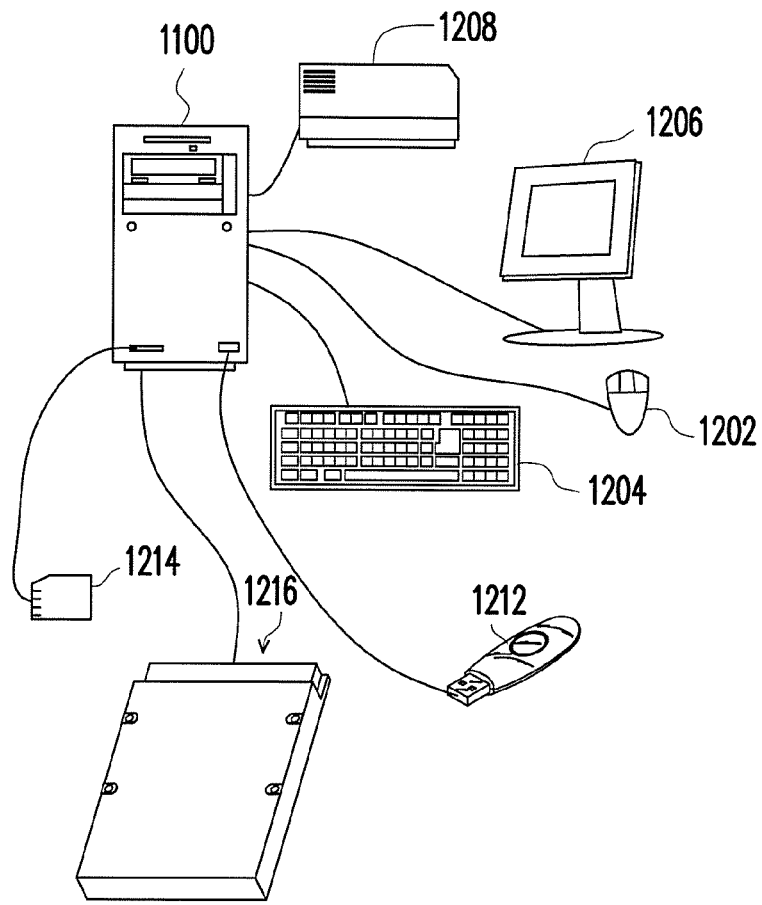
FIG. 2 is a diagram of a computer, an input/output device, and a memory storage device according to an exemplary embodiment of the present invention.

Referring to FIG. 1, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1252, as shown in FIG. 2. However, the I/O device 1106 is not limited to the devices illustrated in FIG. 2 and may further include other devices.

In the present embodiment, a memory storage device 100 is coupled to other components of the host system 1000 via the data transmission interface 1110. Data can be written into or read from the memory storage device 100 through the operations of the microprocessor 1102, the RAM 1104, and the I/O device 1106. The memory storage device 100 is a rewritable non-volatile memory storage device, such as the flash drive 1256, the memory card 1214, or the solid state drive (SSD) 1216 illustrated in FIG. 2.

Figure 3:
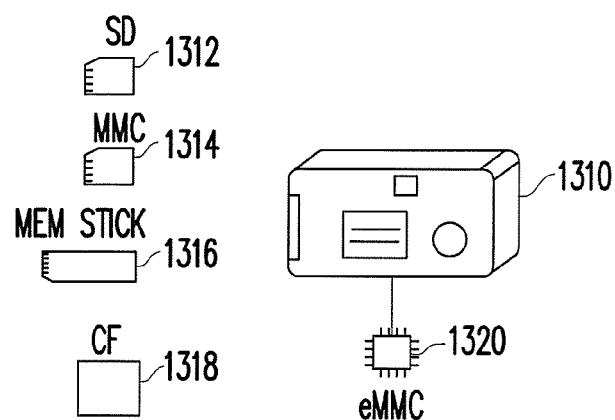
FIG. 3 is a diagram of a host system and a memory storage device according to an exemplary embodiment of the present invention.

Generally speaking, the host system 1000 can be substantially any system that works with the memory storage device 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 3) used by the digital camera (video camera) 1310. The embedded storage device 1320 includes an embedded MMC (eMMC). It should be mentioned that an eMMC is directly coupled to the motherboard of a host system.

Figure 4:
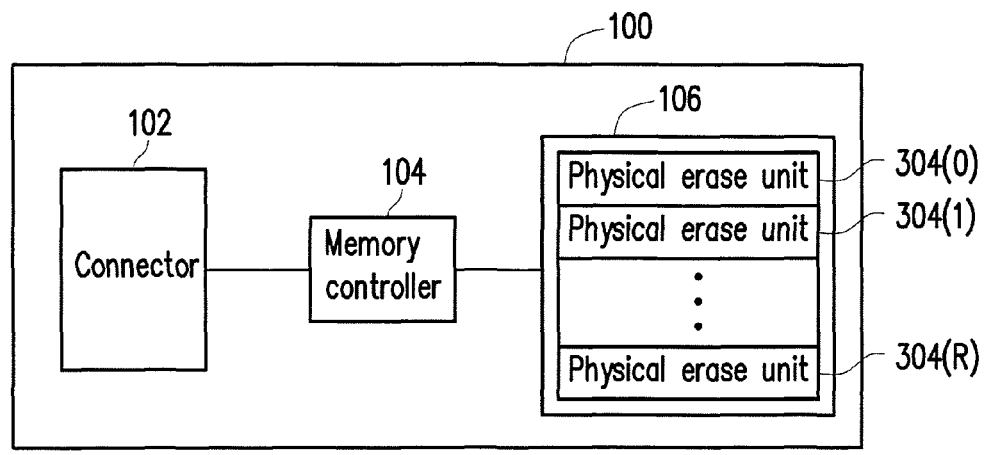
FIG. 4 is a schematic block diagram of a memory storage device according to an exemplary embodiment of the present invention.

FIG. 4 is a schematic block diagram of a memory storage device according to the present exemplary embodiment.

Referring to FIG. 4, the memory storage device 100 includes a connector 102, a memory controller 104, and a rewritable non-volatile memory module 106.

In the present exemplary embodiment, the connector 102 complies with the SD interface standard. However, the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the serial advanced technology attachment (SATA) standard, the ultra high speed-I (UHS-I) interface standard, the ultra high speed-II (UHS-II) interface standard, the MS interface standard, the MMC interface standard, the eMMC interface standard, the universal flash storage (UFS) interface standard, the CF interface standard, the integrated device electronics (IDE) standard, or any other suitable standard.

The memory controller 104 executes a plurality of logic gates or control instructions implemented in a hardware form or a firmware form and performs data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical erase units 304(0)-304(R). The physical erase units 304(0)-304(R) may belong to the same memory die or different memory dies. Each physical erase unit has a plurality of physical program units. The physical program units belonging to the same physical erase unit can be individually written but have to be erased all together. Each physical erase unit may be composed of 128 physical program units. However, the present invention is not limited thereto, and each physical erase unit may also be composed of 64, 256, or any other number of physical program units.

To be specific, physical erase unit is the smallest unit for erasing data. Namely, each physical erase unit contains the least number of memory cells that are erased all together. Physical program unit is the smallest unit for programming data. Namely, physical program unit is the smallest unit for writing data. Each physical program unit usually includes a data bit area and a redundant bit area. The data bit area includes a plurality of physical access addresses for storing user data, and the redundant bit area is used for storing system data (for example, control information and error checking and correcting codes (ECCs)). In the present exemplary embodiment, the data bit area of each physical program unit includes 4 physical access addresses, and the size of each physical access address is 512 bytes. However, the size and number of the physical access addresses are not limited in the invention, and in other exemplary embodiments, a data bit area may also any greater or smaller number of physical access addresses. In an exemplary embodiment, the physical erase units are physical blocks, and the physical program units are physical pages or physical sectors. However, the present invention is not limited thereto.

In the present exemplary embodiment, the rewritable non-volatile memory module 106 is a trinary level cell (TLC) NAND flash memory module (i.e., each memory cell stores data of at least 3 bits). However, the present invention is not limited thereto, and the rewritable non-volatile memory module 106 may also be a single level cell (SLC) NAND flash memory module, a multi level cell (MLC) NAND flash memory module, any other flash memory module, or any memory module with the same characteristics.

Figure 5:
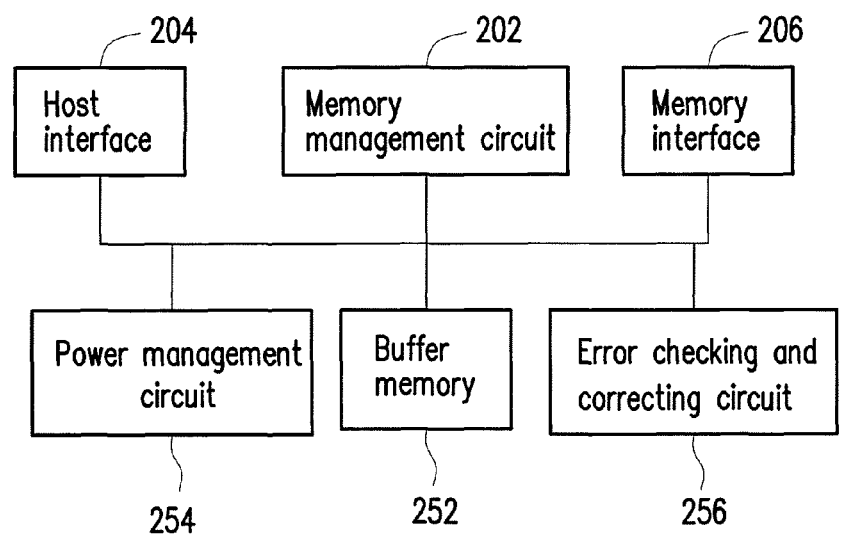
FIG. 5 is a schematic block diagram of a memory controller according to an exemplary embodiment of the present invention.

FIG. 5 is a schematic block diagram of a memory controller according to an exemplary embodiment of the present invention. It should be understood that the structure of the memory controller illustrated in FIG. 5 is only an example but not intended to limit the scope of the present invention.

Referring to FIG. 5, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage device 100 is in operation, the control instructions are executed to perform data writing, data reading, and data erasing operations.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage device 100 is in operation, the control instructions are executed by the microprocessor unit to carry out data writing, data reading, and data erasing operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has boot codes. When the memory controller 104 is enabled, the microprocessor unit first executes the boot codes to load the control instructions from the rewritable non-volatile memory module 106 into the RAM of the memory management circuit 202. Thereafter, the microprocessor unit runs the control instructions to perform various data writing, reading, and erasing operations.

In yet another exemplary embodiment of the present invention, the control instructions of the memory management circuit 202 may also be implemented in a hardware form. For example, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the physical erase units of the rewritable non-volatile memory module 106. The memory writing circuit is configured to issue a write command to the rewritable non-volatile memory module 106 to write data into the rewritable non-volatile memory module 106. The memory reading circuit is configured to issue a read command to the rewritable non-volatile memory module 106 to read data from the rewritable non-volatile memory module 106. The memory erasing circuit is configured to issue an erase command to the rewritable non-volatile memory module 106 to erase data from the rewritable non-volatile memory module 106. The data processing circuit is configured to process data to be written into and read from the rewritable non-volatile memory module 106.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the SD standard. However, the present invention is not limited thereto, and the host interface 204 may also comply with the PATA standard, the IEEE 1394 standard, the PCI express standard, the USB standard, the SATA standard, the UHS-I interface standard, the UHS-II interface standard, the MS standard, the MMC standard, the eMMC interface standard, the UFS interface standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the present invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. In the present exemplary embodiment, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 performs the ECC procedure on the data according to the ECC code. To be specific, the ECC circuit 256 is designed to correct a specific number of error bits (referred to as a maximum correctable error bit number thereinafter). For example, the maximum correctable error bit number is 24. If the number of error bits in data is not greater than 24, the ECC circuit 256 can correct the values of the error bits according to the corresponding ECC code. Otherwise, the ECC circuit 256 reports that the error correcting process fails, and the memory management circuit 202 sends a message indicating that the data is lost to the host system 1000.

Figure 6:
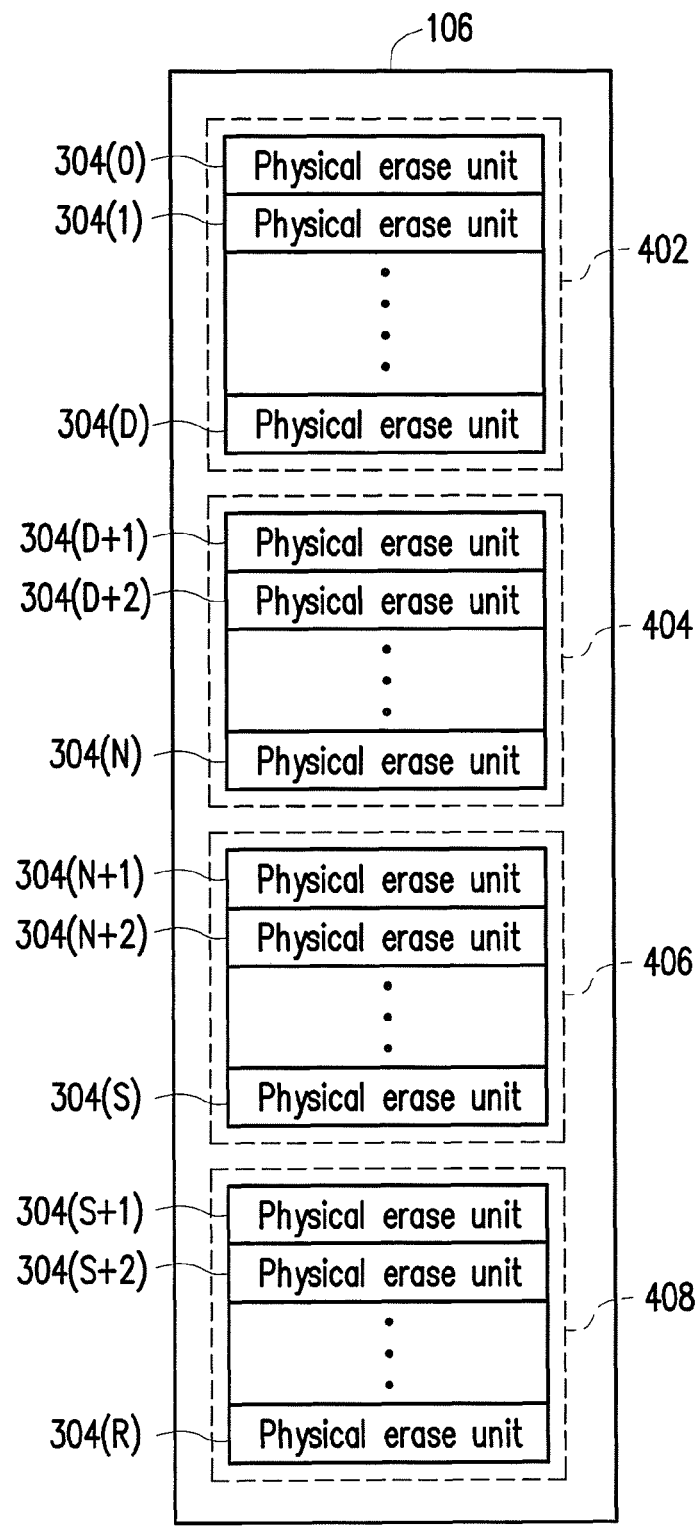
FIG. 6 and FIG. 7 are diagrams illustrating an example of managing a rewritable non-volatile memory module according to an exemplary embodiment of the present invention.
Figure 7:
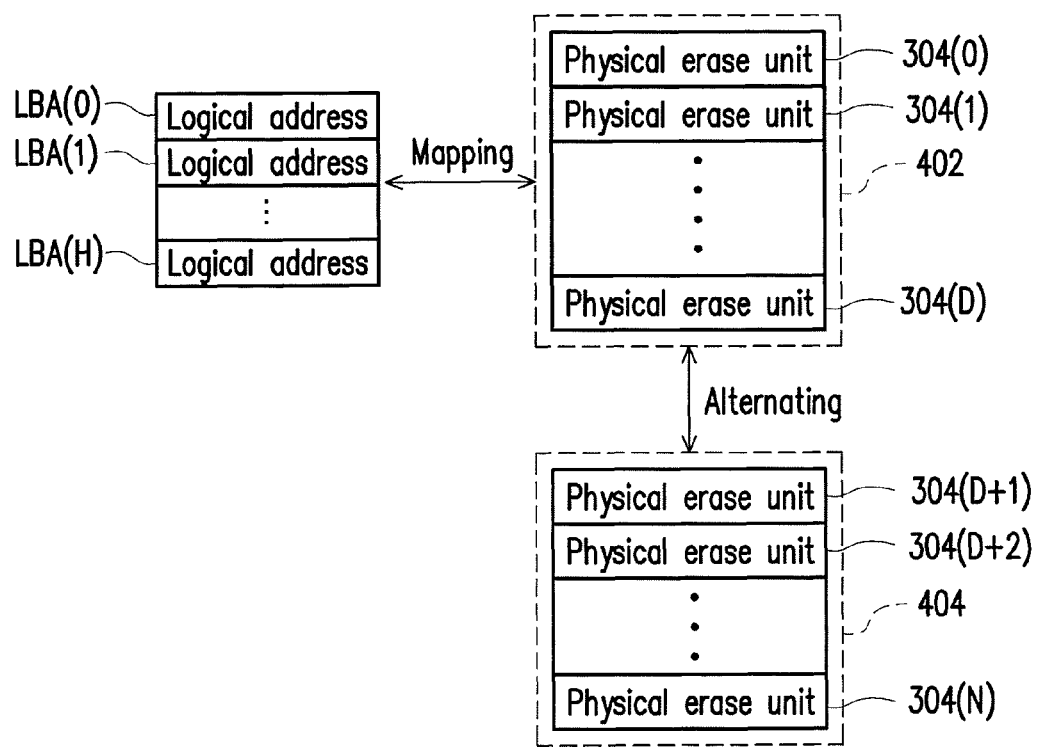

FIG. 6 and FIG. 7 are diagrams illustrating an example of managing a rewritable non-volatile memory module according to an exemplary embodiment of the present invention.

It should be understood that while describing the operations performed on the physical erase units of the rewritable non-volatile memory module 106, the terms like "select", "substitute", "group", and "alternate" refer to logical operations performed on the physical erase units. Namely, the actual positions of the physical erase units in the rewritable non-volatile memory module 106 are not changed and the operations are logically performed on the physical erase units of the rewritable non-volatile memory module 106.

Referring to FIG. 6, the memory controller 104 (or the memory management circuit 202) logically groups (or allocates) the physical erase unit 304(0)-304(R) of the rewritable non-volatile memory module 106 into a data area 402, a spare area 404, a system area 406, and a replacement area 408.

The physical erase units logically belonging to the data area 402 and the spare area 404 are used for storing data from the host system 1000. To be specific, the physical erase units (also referred to as data physical erase units) in the data area 402 are considered physical erase units containing data, while the physical erase units (also referred to as spare physical erase units) in the spare area 404 are physical erase units used for writing new data. For example, when a write command and data to be written are received from the host system 1000, the memory controller 104 (or the memory management circuit 202) selects a physical erase unit from the spare area 404, processes the data to be written, and writes the data into the selected physical erase unit.

The physical erase units logically belonging to the system area 406 are used for recording system data. Herein the system data includes the manufacturer and model of the memory chip, the number of physical erase units in the memory chip, and the number of physical program units in each physical erase unit, etc.

The physical erase units logically belonging to the replacement area 408 are substitution physical erase units. For example, after the rewritable non-volatile memory module 106 is manufactured, 4% of its physical erase units are reserved for substitution purpose. Namely, when a physical erase unit in the data area 402, the spare area 404, or the system area 406 is damaged, a physical erase unit in the replacement area 408 is used for replacing the damaged physical erase unit (i.e., a bad block). Thus, if there are still normal physical erase units in the replacement area 408 and a physical erase unit is damaged, the memory controller 104 (or the memory management circuit 202) selects a normal physical erase unit from the replacement area 408 to replace the damaged physical erase unit. If there is not any normal physical erase unit in the replacement area 408 and a physical erase unit is damaged, the memory controller 104 declares that the memory storage device 100 enters a write protect state and no data should be written therein.

In particular, the numbers of the physical erase units in the data area 402, the spare area 404, the system area 406, and the replacement area 408 vary with different memory specifications. In addition, during the operation of the memory storage device 100, the physical erase units grouped into the data area 402, the spare area 404, the system area 406, and the replacement area 408 are dynamically changed. For example, when a physical erase unit in the spare area 404 is damaged and accordingly replaced by a physical erase unit in the replacement area 408, the physical erase unit originally belonging to the replacement area 408 is linked to the spare area 404.

Referring to FIG. 7, in order to allow the host system 1000 to conveniently access the physical erase units that are alternatively used for storing data, the memory controller 104 configures logical addresses LBA(0)-LBA(H) to map the physical erase units in the data area 402 such that the host system 1000 can directly write and read data according to these logical addresses. In the present exemplary embodiment, the memory controller 104 (or the memory management circuit 202) maintains a logical address-physical erase unit mapping table to record the mapping relationship (i.e., mapping information) between the logical addresses LBA (0)-LBA(H) and the physical erase units in the data area 402.

Figure 8:
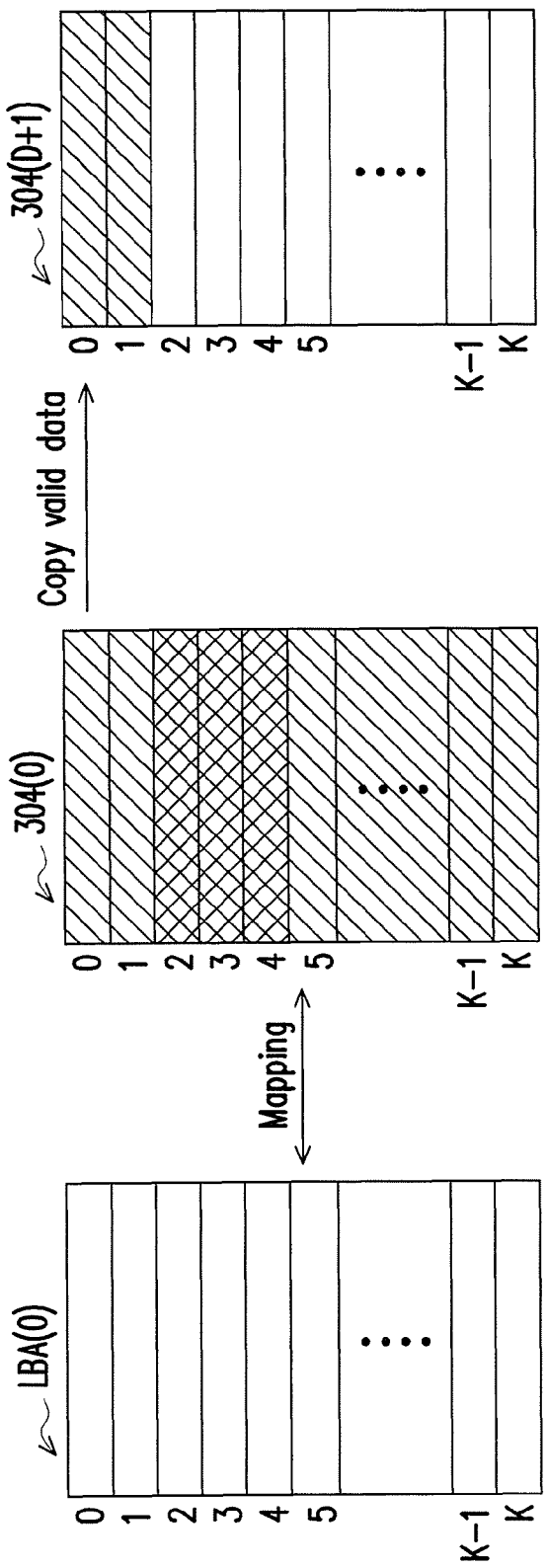
FIG. 8 and FIG. 9 illustrate an example of writing an update data by using a substitution physical erase unit according to an exemplary embodiment of the present invention.
Figure 9:
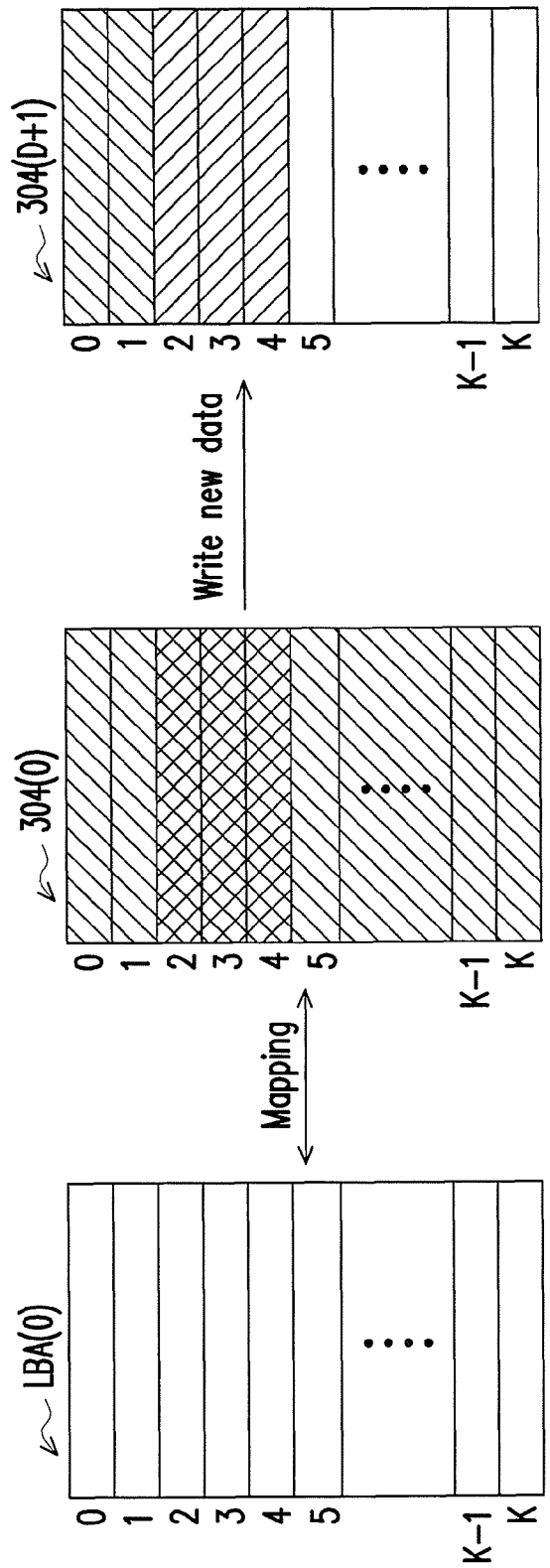

FIG. 8 and FIG. 9 illustrate an example of writing an update data by using a substitution physical erase unit according to an exemplary embodiment of the present invention.

Referring to both FIG. 8 and FIG. 9, when the logical address LBA(0) is mapped to the physical erase unit 304(0) and the memory controller 104 receives a write command for writing update data into a logical program unit corresponding to the logical address LBA(0) from the host system 1000, the memory controller 104 identifies that the logical address LBA (0) is currently mapped to the physical erase unit 304(0) according to the logical address-physical erase unit mapping table and selects the physical erase unit 304(D+1) from the spare area 404 for writing the update data. However, in the course of writing the update data into the physical erase unit 304(D+1), the memory controller 104 does not instantly move all valid data in the physical erase unit 304(0) to the physical erase unit 304(D+1) to erase the physical erase unit 304(0). To be specific, the memory controller 104 (or the memory management circuit 202) reads the valid data before the physical program unit to be written (i.e., data in the 0th physical program unit and the $1^{st}$ physical program unit of the physical erase unit 304(0)) from the physical erase unit 304 (0). After that, the memory controller 104 (or the memory management circuit 202) writes the valid data before the physical program unit to be written in the physical erase unit 304(0) into the $0^{th}$ physical program unit and the $1^{st}$ physical program unit of the physical erase unit 304(D+1) (as shown in FIG. 8) and writes the update data into the $2^{nd}$ to the $4^{th}$ physical program unit of the physical erase unit 304(D+1) (as shown in FIG. 9). Herein the memory controller 104 completes the data writing operation. Because the valid data in the physical erase unit 304(0) may become invalid in a next operation (for example, a write command), instantly moving all valid data in the physical erase unit 304(0) to the physical erase unit 304(D+1) may become meaningless. In addition, data has to be written into the physical program units of a physical erase unit according to the write sequence of the physical program units. Thus, the memory controller 104 (or the memory management circuit 202) only moves the valid data before the physical program unit to be written (i.e., data stored in the $0^{th}$ physical program unit and the $1^{st}$ physical program unit of the physical erase unit 304(0)) and does not move the remaining valid data (i.e., data stored in the $5^{th}$ to the $K^{th}$ physical program unit of the physical erase unit 304(0)) for the time being. Namely. The physical program units in the physical erase unit 304(0) and the physical erase unit 304(D+ 1) are mapped to the logical program units corresponding to the logical address LBA(0).

In the present exemplary embodiment, the operation of maintaining aforementioned temporary relationship is referred to as opening mother-child physical erase units. Besides, the original physical erase unit (i.e., the physical erase unit 304(0)) is referred to as a mother physical erase unit or an updated physical erase unit, and the physical erase unit for substituting the mother physical erase unit (i.e., the physical erase unit 304(D+1)) is referred to as a child physical erase unit or a substitution physical erase unit. Herein a mother physical erase unit and a child physical erase unit used for storing data belonging to the same logical address are referred to as a mother-child physical erase unit set.

It should be mentioned that the number of physical erase units in the spare area 404 is limited. Accordingly, during the operation of the memory storage device 100, the number of open mother-child physical erase unit sets is also limited. Namely, during the operation of the memory storage device 100, the number of open mother-child physical erase unit sets cannot exceed a mother-child physical erase unit number threshold. In the present exemplary embodiment, the mother-child physical erase unit number threshold is set to 3. However, the present invention is not limited thereto. Thus, when the memory storage device 100 receives a write command from the host system 1000, if the number of open mother-child physical erase unit sets reaches the mother-child physical erase unit number threshold, the memory controller 104 needs to perform a data merging operation to close at least one mother-child physical erase unit set before it executes the write command. To be specific, during the data merging operation, the memory controller 104 combines the data of the mother physical erase unit and the child physical erase unit into a single physical erase unit.

Figure 10:
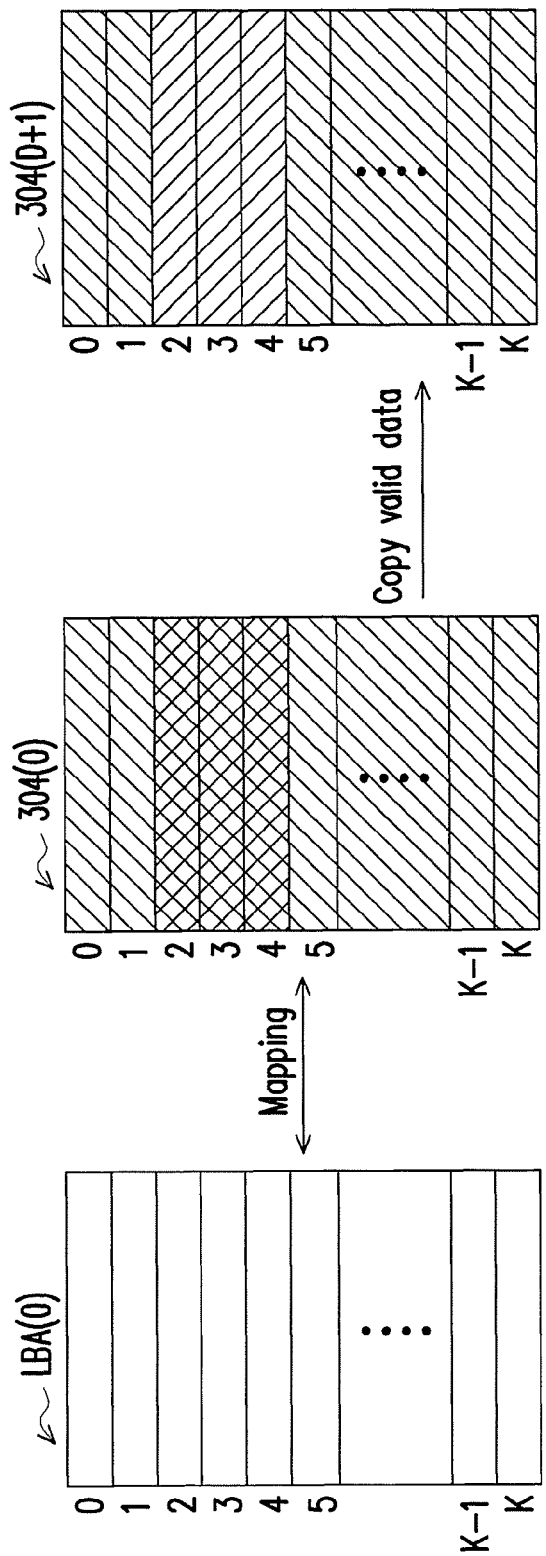
FIG. 10 illustrates an example of a data merging operation according to an exemplary embodiment of the present invention.

FIG. 10 illustrates an example of a data merging operation according to an exemplary embodiment of the present invention.

Referring to FIG. 10, if the valid data in the physical erase unit 304(0) and the physical erase unit 304(D+1) (as shown in FIG. 9) is to be merged, the memory controller 104 (or the memory management circuit 202) reads the remaining valid data (i.e., data in the $5^{th}$ to the $K^{th}$ physical program unit of the physical erase unit 304(0)) from the physical erase unit 304 (0) and writes the remaining valid data in the physical erase unit 304(0) into the $5^{th}$ to the $K^{th}$ physical program unit of the physical erase unit 304(D+1). Thereafter, the memory controller 104 (or the memory management circuit 202) links the physical erase unit 304(D+1) to the data area 402. Namely, the memory controller 104 (or the memory management circuit 202) re-maps the logical address LBA(0) to the physical erase unit 304(D+1) in the logical address-physical erase unit mapping table. In addition, the memory controller 104 (or the memory management circuit 202) performs an erasing operation on the physical erase unit 304(0) and links the erased physical erase unit 304(0) to the spare area 404. In the present exemplary embodiment, the memory controller 104 (or the memory management circuit 202) may establish a spare area physical erase unit table (not shown) for recording the physical erase units currently linked to the spare area 404.

Because the logical program units of the logical addresses are mapped to the physical program units of different physical erase units in the course of opening mother-child physical erase units, the memory controller 104 (or the memory management circuit 202) may use a variable table to record the temporary relationship between the logical addresses and the mother-child physical erase unit sets.

Besides using a substitution physical erase unit to write data, in the present exemplary embodiment, the memory controller 104 (or the memory management circuit 202) further selects at least one physical erase unit from the spare area 404 as a random physical erase unit and uses the random physical erase unit for writing data. For example, if data of a logical program unit to be updated by the host system 1000 is already written into a substitution physical erase unit, the update data is temporarily written into a random physical erase unit.

Figure 11:
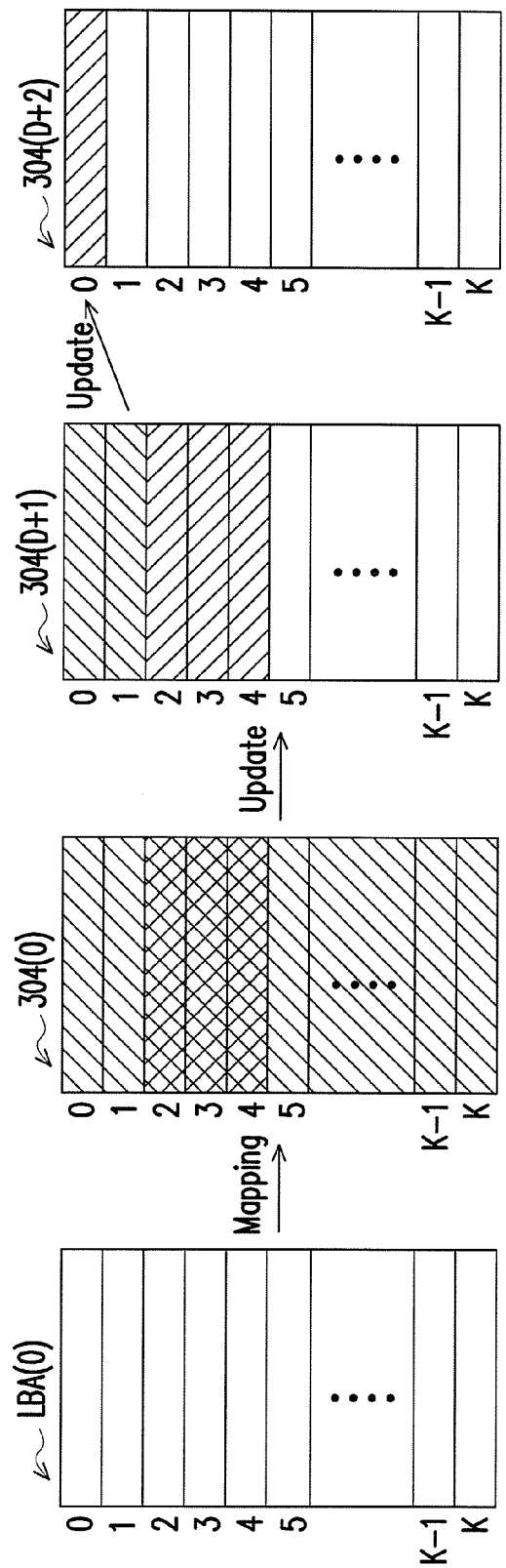
FIG. 11 and FIG. 12 are diagrams illustrating how data is written and merged by using a substitution physical erase unit and a random physical erase unit according to an exemplary embodiment of the present invention.
Figure 12:
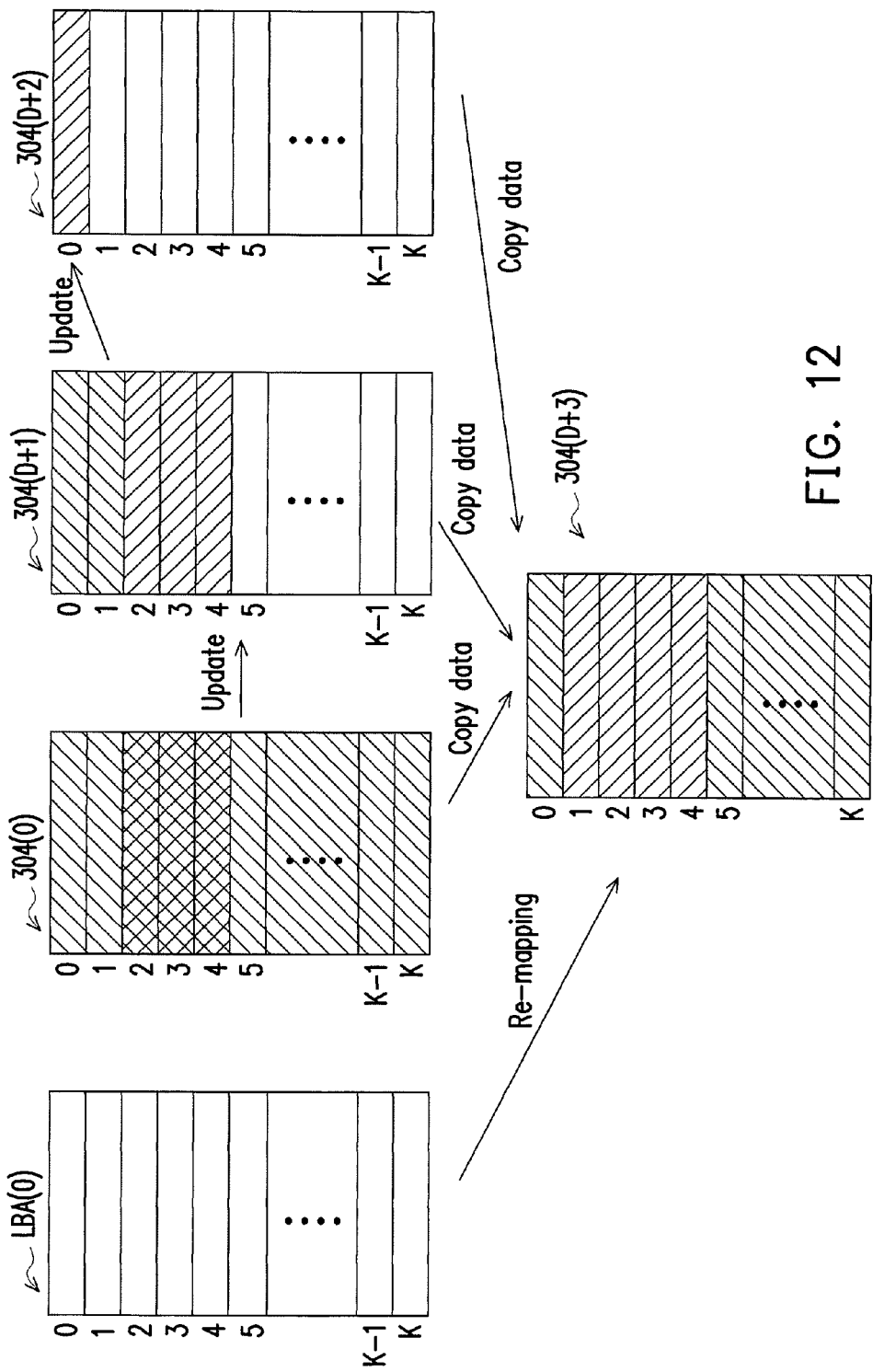

FIG. 11 and FIG. 12 are diagrams illustrating how data is written and merged by using a substitution physical erase unit and a random physical erase unit according to an exemplary embodiment of the present invention.

Referring to FIG. 11, when the physical erase unit 304(D+2) is selected as a random physical erase unit and the host system 1000 is about to write update data into the $1^{st}$ logical program unit of the logical address LBA(0) in the storage state illustrated in FIG. 9, the memory management circuit 202 writes the update data into the first blank physical program unit of the random physical erase unit (for example, the $0^{th}$ physical program unit of the physical erase unit 304(D+2)).

In the present exemplary embodiment, when the current random physical erase unit is full, the memory management circuit 202 selects another physical erase unit from the spare area 404 as a new random physical erase unit until the number of physical erase units in the spare area 404 is smaller than a predetermined number. To be specific, because the number of physical erase units in the spare area 404 is limited, the number of physical erase units that can be served as random physical erase units is also limited. When the number of physical erase units in the spare area 404 is smaller than the predetermined number, the memory controller 104 (or the memory management circuit 202) performs a data merging operation, performs an erasing operation on each random physical erase unit that contains only invalid data, and links the erased physical erase units to the spare area 404. Thereby, when a next write command is executed, the memory management circuit 202 can select a blank physical erase unit from the spare area 404 as a random physical erase unit.

Referring to FIG. 12, when a data merging operation is performed on the logical address LBA(0) in the state illustrated in FIG. 11, the memory controller 104 (or the memory management circuit 202) selects a blank physical erase unit 304(D+3) from the spare area 404, copies valid data belonging to the logical address LBA(0) from the physical erase unit 304(0), the substitution physical erase unit 304(D+1), and the random physical erase unit 304(D+2) into the physical erase unit 304(D+3), and re-maps the logical address LBA(0) to the physical erase unit 304(D+3).

To be specific, in the course of copying the valid data, data in the $0^{th}$ physical program unit of the physical erase unit 304(0) is read and written into the $0^{th}$ physical program unit of the physical erase unit 304(D+3). After that, data in the $1^{st}$ physical program unit of the physical erase unit 304(D+2) is read and written into the $1^{st}$ physical program unit of the physical erase unit 304(D+3). Next, data in the $2^{nd}$ to the $4^{th}$ physical program unit of the physical erase unit 304(D+1) is sequentially read and written into the $2^{nd}$ to the $4^{th}$ physical program unit of the physical erase unit 304(D+3). Eventually, data in the $5^{th}$ to the $K^{th}$ physical program unit of the physical erase unit 304(0) is read and written into the $5^{th}$ to the $K^{th}$ physical program unit of the physical erase unit 304(D+3). In particular, after moving the valid data, the memory controller 104 (or the memory management circuit 202) records that the logical address LBA(0) is re-mapped to the physical erase unit 304(D+3) (i.e., links the physical erase unit 304(D+3) to the data area 402) in the logical address-physical erase unit mapping table, performs erasing operations on the physical erase unit 304(0), the physical erase unit 304(D+1), and the physical erase unit 304(D+2) (i.e., erases data from the physical erase unit 304(0), the physical erase unit 304(D+1), and the physical erase unit 304(D+2)), and links the physical erase unit 304(0), the physical erase unit 304(D+1), and the physical erase unit 304(D+2) to the spare area 404.

As described above, in the present exemplary embodiment, during the operation of the memory storage device 100, the memory controller 104 (or the memory management circuit 202) selects a physical erase unit from the spare area 404 as a substitution physical erase unit for a physical erase unit which already contains data (i.e., a data physical erase unit in the data area 402) or a random physical erase unit for temporarily storing data, so as to increase the efficiency in writing data. It should be understood that the number of substitution physical erase units or random physical erase units is not limited to 1. For example, the memory controller 104 (or the memory management circuit 202) can configure multiple substitution physical erase units or multiple random physical erase units for one data physical erase unit to write update data. Herein the substitution physical erase units and the random physical erase units are all referred to as temporary physical erase units.

In the present exemplary embodiment, after writing data to be stored by the host system 1000 into a substitution physical erase unit or a random physical erase unit, the memory controller 104 (or the memory management circuit 202) sends a response indicating that the write command is completed to the host system 1000 and then performs a data merging procedure at a proper timing (for example, when it is in an idle state).

However, if a power failure occurs to the memory storage device 100 when the data merging procedure is performed, data may not be successfully moved into the new physical erase unit. In the present exemplary embodiment, the memory controller 104 (or the memory management circuit 202) determines whether the data is successfully written into the new physical erase unit through an ECC procedure (or the ECC circuit 256).

For example, as shown in FIG. 12, if a power failure occurs during the operations in which valid data belonging to the logical address LBA(0) is moved from the physical erase unit 304(0), the physical erase unit 304(D+1), and the physical erase unit 304(D+2) into the physical erase unit 304(D+3), once the memory storage device 100 is powered on again, the memory controller 104 (or the memory management circuit 202) scans the redundant bit areas in the physical erase units and accordingly identifies that the physical erase unit 304(0), the physical erase unit 304(D+1), the physical erase unit 304(D+2), and the physical erase unit 304(D+3) contain data belonging to the logical address LBA(0) and the physical erase unit 304(D+3) is the last written physical erase unit. In addition, the memory controller 104 (or the memory management circuit 202) identifies the last written physical program unit (for example, the $2^{nd}$ physical program unit) in the physical erase unit 304(D+3) and determines whether data stored in the $2^{nd}$ physical program unit of the physical erase unit 304 (D+3) contains any error bit. For example, the ECC circuit 256 performs an ECC procedure on the data stored in the $2^{nd}$ physical program unit of the physical erase unit 304(D+3) according to an ECC code read from the redundant bit area of the $2^{nd}$ physical program unit in the physical erase unit 304 (D+3).

If the data stored in the $2^{nd}$ physical program unit of the physical erase unit 304(D+3) does not contain any error bit, the memory controller 104 (or the memory management circuit 202) continues to perform the data merging procedure by using the physical erase unit 304(D+3).

If the data stored in the $2^{nd}$ physical program unit of the physical erase unit 304(D+3) contains error bits and the error bits are not correctable (i.e., the number of error bits in the data is greater than the maximum correctable error bit number), the memory controller 104 (or the memory management circuit 202) performs an erasing operation on the physical erase unit 304(D+3) and keeps using the physical erase unit 304(0), the physical erase unit 304(D+1), and the physical erase unit 304(D+2) to store valid data belonging to the logical address LBA(0) (i.e., without completing the data merging procedure).

If the data stored in the $2^{nd}$ physical program unit of the physical erase unit 304(D+3) contains error bits and the error bits are correctable (i.e., the number of error bits in the data is not greater than the maximum correctable error bit number), the memory controller 104 (or the memory management circuit 202) determines whether the physical erase unit 304(D+3) contains any dancing bit. Herein a physical erase unit containing dancing bits means that the charges stored in the physical erase unit are in an unstable state. In particular, when a physical erase unit contains dancing bits, data in the physical erase unit may be correctly read but will be lost after some time.

For example, in an exemplary embodiment of the present invention, the memory controller 104 (or the memory management circuit 202) determines whether the number of error bits in the data stored in the $2^{nd}$ physical program unit of the physical erase unit 304(D+3) is greater than the error bit number threshold. If the number of error bits in the data stored in the $2^{nd}$ physical program unit of the physical erase unit 304(D+3) is greater than the error bit number threshold, the memory controller 104 (or the memory management circuit 202) identifies that the physical erase unit 304(D+3) contains dancing bits. In the present exemplary embodiment, the error bit number threshold is set to 20. However, the present invention is not limited thereto.

If the physical erase unit 304(D+3) does not contain any dancing bit, the memory controller 104 (or the memory management circuit 202) continues to perform the data merging procedure by using the physical erase unit 304(D+3). Contrarily, if the physical erase unit 304(D+3) contains dancing bits, the memory controller 104 (or the memory management circuit 202) performs an erasing operation on the physical erase unit 304(D+3) and keeps using the physical erase unit 304(0), the physical erase unit 304(D+1), and the physical erase unit 304(D+2) to store valid data belonging to the logical address LBA(0) (i.e., without completing the data merging procedure).

As described above, when a power failure occurs in the course of performing a data merging procedure, the memory controller 104 (or the memory management circuit 202) ensures the reliability of a stored data by identifying whether a physical erase unit contains any dancing bit.

Figure 13:
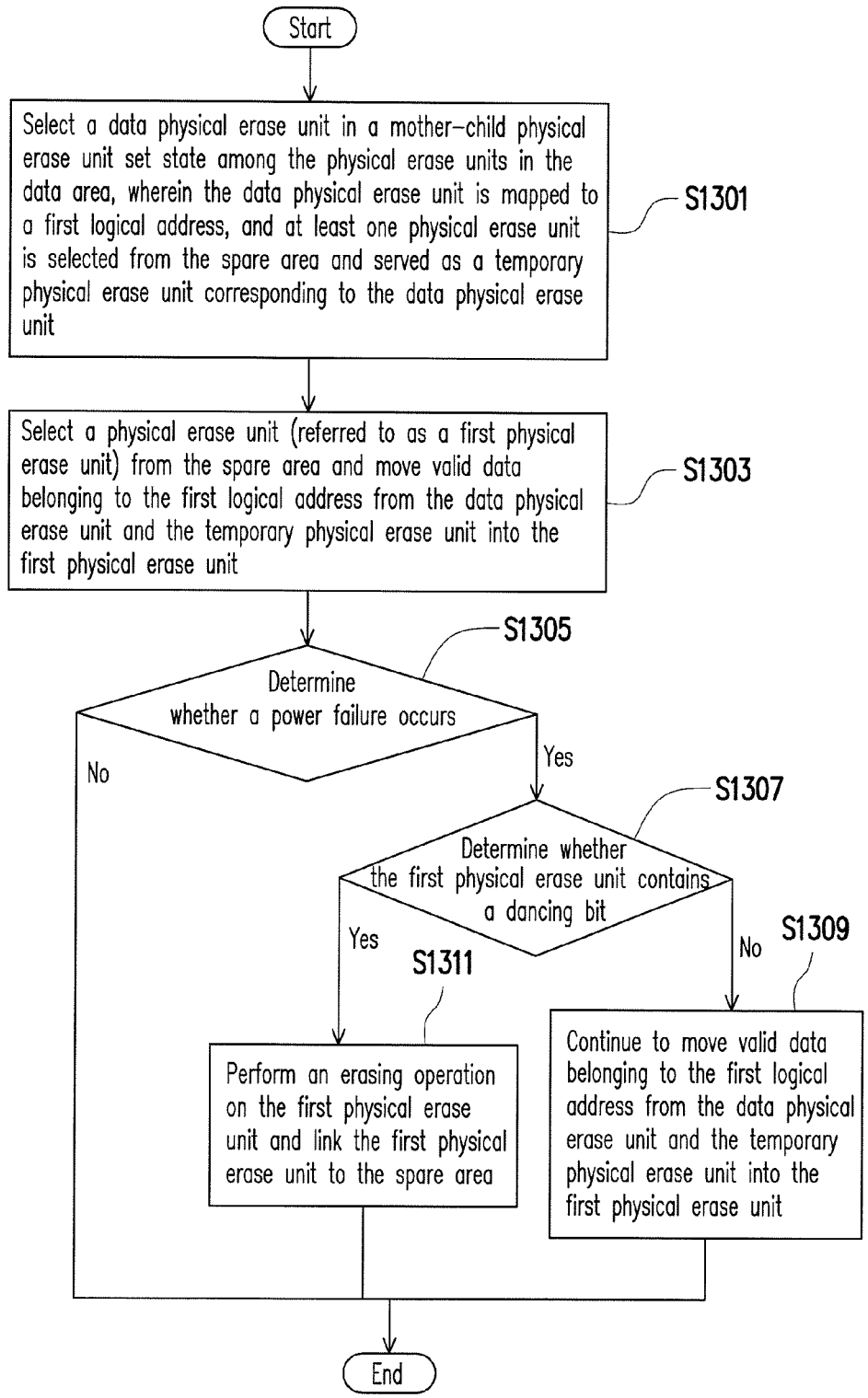
FIG. 13 is a flowchart of a data storing method according to an exemplary embodiment of the present invention.

FIG. 13 is a flowchart of a data storing method according to an exemplary embodiment of the present invention.

Referring to FIG. 13, when a data merging procedure is to be performed, in step S1301, the memory controller 104 (or the memory management circuit 202) selects a data physical erase unit in a mother-child physical erase unit set state among the physical erase units in the data area 402. Herein the data physical erase unit is mapped to a first logical address, and at least one physical erase unit is selected from the spare area 404 and served as a temporary physical erase unit corresponding to the data physical erase unit.

In step S1303, the memory controller 104 (or the memory management circuit 202) selects a physical erase unit (referred to as a first physical erase unit) from the spare area 404 and moves valid data belonging to the first logical address from the data physical erase unit and the temporary physical erase unit into the first physical erase unit.

In step S1305, the memory controller 104 (or the memory management circuit 202) determines whether a power failure occurs.

If no power failure occurs, the procedure illustrated in FIG. 13 is terminated. To be specific, if no abnormality occurs during the data merging procedure, the memory controller 104 (or the memory management circuit 202) identifies that the data merging procedure is successfully completed.

If a power failure occurs, in step S1307, the memory controller 104 (or the memory management circuit 202) determines whether the first physical erase unit contains a dancing bit.

If the first physical erase unit does not contain the dancing bit, in step S1309, the memory controller 104 (or the memory management circuit 202) continues to move valid data belonging to the first logical address from the data physical erase unit and the temporary physical erase unit into the first physical erase unit.

If the first physical erase unit contains the dancing bit, in step S1311, the memory controller 104 (or the memory management circuit 202) performs an erasing operation on the first physical erase unit and links the first physical erase unit to the spare area 404.

In another exemplary embodiment of the invention, after the step S1311, the memory controller 104 (or the memory management circuit 202) instantly selects a second physical erase unit among the physical erase units in the spare area 404 and moves valid data belonging to the first logical address from the data physical erase unit and the temporary physical erase unit into the second physical erase unit, so as to complete the data merging procedure. However, the invention is not limited thereto, and the memory controller 104 (or the memory management circuit 202) may also perform the data merging procedure again at any other suitable time.

Besides ensuring data reliability by determining whether a physical erase unit contains any dancing bit during a data merging procedure, in another exemplary embodiment of the present invention, the memory controller 104 (or the memory management circuit 202) further ensure the reliability of system data by determining whether the physical erase unit contains any dancing bit while writing the system data into the system area 406.

As described above, the physical erase units 304(N+1)-304(S) are initially configured in the system area 406 for storing system data. Generally speaking, the quantity of system data is smaller than the capacity of a physical erase unit. Thus, the memory controller 104 (or the memory management circuit 202) continues to use the physical program units of the physical erase units in the system area 406 for writing updated system data.

Figure 14:
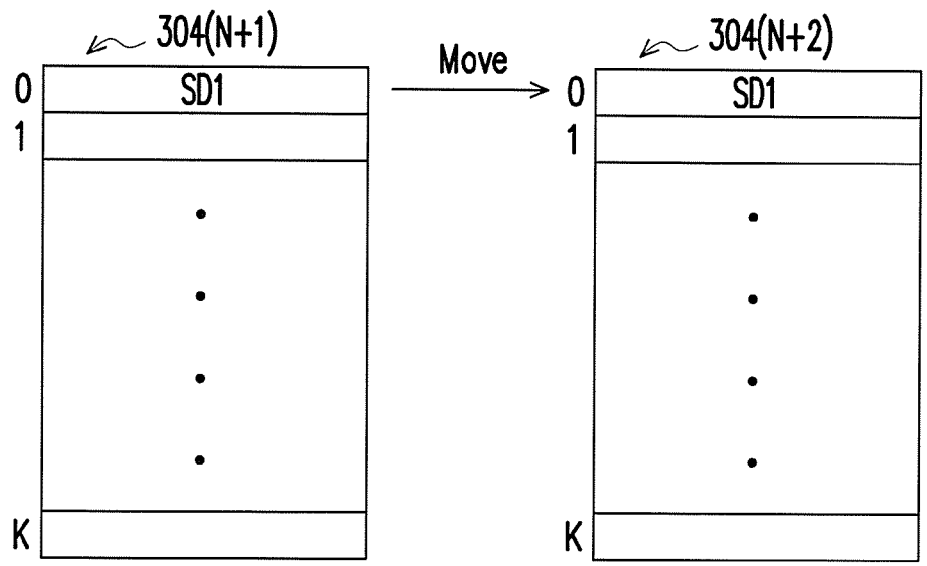
FIG. 14 is a diagram illustrating how a system data is stored according to an exemplary embodiment of the present invention.

FIG. 14 is a diagram illustrating how a system data is stored according to an exemplary embodiment of the present invention.

Referring to FIG. 14, herein it is assumed that a system data SD1 needs to take up the capacity of one physical program unit. While writing the system data SD1 into the $0^{th}$ physical program unit of the physical erase unit 304(N+1) in the system area 406, the memory controller 104 (or the memory management circuit 202) determines whether the physical erase unit 304(N+1) contains any dancing bit.

For example, as described above, the memory controller 104 (or the memory management circuit 202) reads the system data SD1 written into the $0^{th}$ physical program unit of the physical erase unit 304(N+1) and determines whether the number of error bits in the system data SD1 is greater than an error bit number threshold and not greater than a maximum correctable error bit number. If the number of error bits in the system data SD1 is greater than the error bit number threshold and not greater than the maximum correctable error bit number, the memory controller 104 (or the memory management circuit 202) determines that the physical erase unit 304(N+1) contains dancing bits. Contrarily, the memory controller 104 (or the memory management circuit 202) determines that the physical erase unit 304(N+1) does not contain any dancing bit.

Particularly, if the physical erase unit 304(N+1) contains a dancing bit, the memory controller 104 (or the memory management circuit 202) selects another physical erase unit (for example, the physical erase unit 304(N+2)) from the system area 406 and writes the system data SD1 into the physical erase unit 304(N+2). Similarly, after writing the system data SD1, the memory controller 104 (or the memory management circuit 202) determines whether the physical erase unit contains any dancing bit. It should be mentioned that if the physical erase unit 304(N+1) also contains other valid data besides the system data SD1, in another exemplary embodiment of the invention, the memory controller 104 (or the memory management circuit 202) first moves the valid data from the physical erase unit 304(N+1) to the physical erase unit 304(N+2) and then writes the system data SD1 into the physical erase unit 304(N+2).

Figure 15:
FIG. 15 is a diagram illustrating how a system data is stored according to another exemplary embodiment of the present invention.

If the physical erase unit 304(N+1) does not contain any dancing bit, the memory controller 104 (or the memory management circuit 202) identifies that the system data SD1 has been reliably stored. Subsequently, when the system data SD1 is to be replaced by a new system data SD2, the memory controller 104 (or the memory management circuit 202) writes the system data SD2 into the $1^{st}$ physical program unit of the physical erase unit 304(N+1) in the system area 406 and determines again whether the physical erase unit 304(N+1) contains any dancing bit (as shown in FIG. 15). Thereby, the memory controller 104 (or the memory management circuit 202) can ensure the accuracy of the system data every time when the system data is updated.

In the present exemplary embodiment, multiple physical erase units are configured in the system area 406 when the memory storage device 100 is initialized. However, the present invention is not limited thereto, and in another exemplary embodiment of the invention, one physical erase unit may also be initially configured in the system area 406, and when a blank physical erase unit is required for storing system data, the memory controller 104 (or the memory management circuit 202) may select a physical erase unit from the spare area 404 as the physical erase unit in the system area 406. In addition, the physical erase units containing invalid data in the system area 406 may also be erased and linked to the spare area 404 to be used again.

Figure 16:
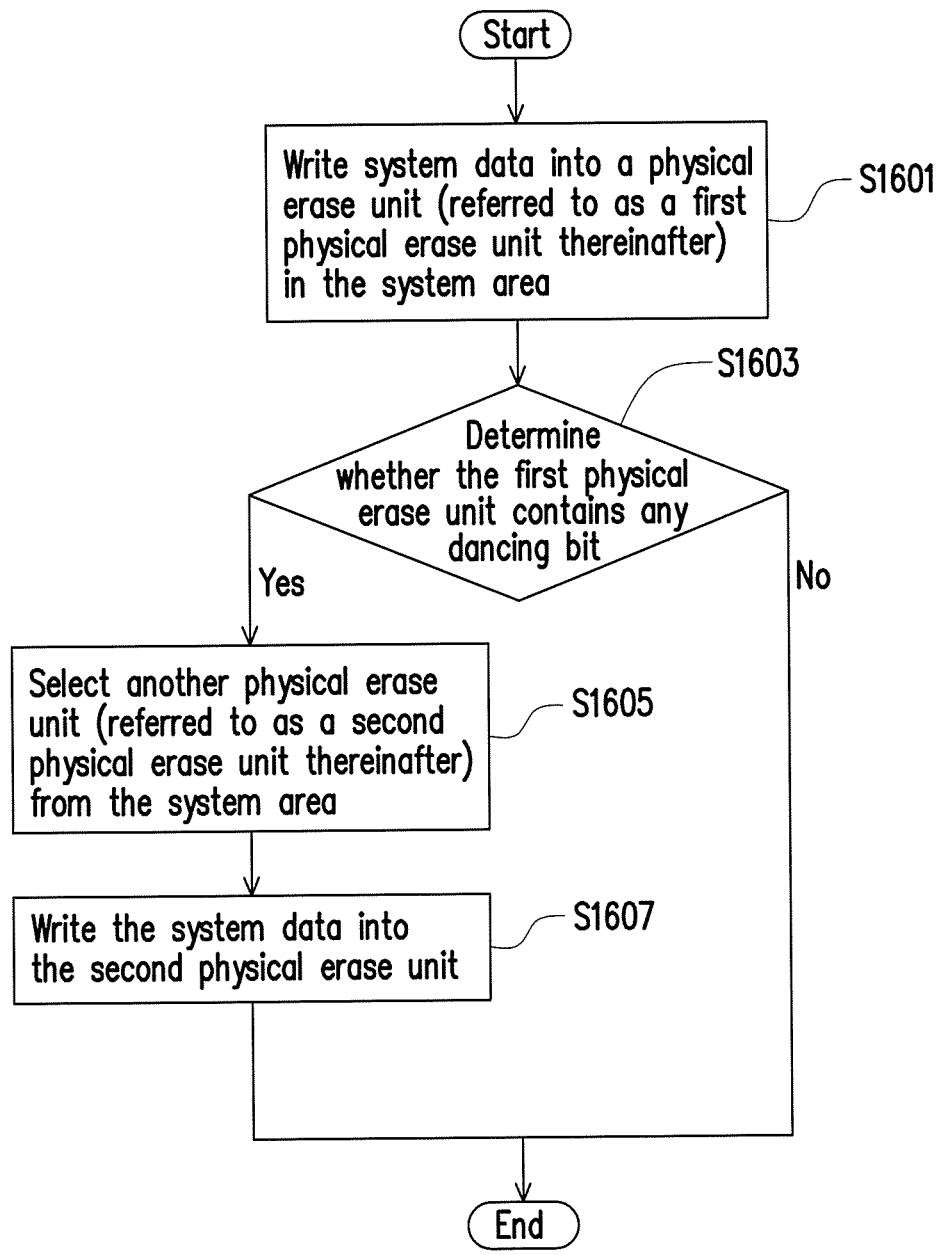
FIG. 16 is a flowchart of a data storing method according to another exemplary embodiment of the present invention, in which the steps of writing a system data into a system area are illustrated.

FIG. 16 is a flowchart of a data storing method according to another exemplary embodiment of the invention, in which the steps of writing system data into the system area are illustrated.

Referring to FIG. 16, in step 1601, the memory controller 104 (or the memory management circuit 202) writes system data into a physical erase unit (referred to as a first physical erase unit thereinafter) in the system area 406.

In step S1603, the memory controller 104 (or the memory management circuit 202) determines whether the first physical erase unit contains any dancing bit.

If the first physical erase unit does not contain the dancing bit, the procedure illustrated in FIG. 16 is terminated.

If the first physical erase unit contains the dancing bit, in step S1605, the memory controller 104 (or the memory management circuit 202) selects another physical erase unit (referred to as a second physical erase unit thereinafter) from the system area 406. Besides, in step S1607, the memory controller 104 (or the memory management circuit 202) writes the system data into the second physical erase unit. Particularly, in another exemplary embodiment, when step S1607 is executed, the memory controller 104 (or the memory management circuit 202) determines whether the first physical erase unit contains other valid data. If the first physical erase unit contains other valid data, the memory controller 104 (or the memory management circuit 202) moves the valid data from the first physical erase unit to the second physical erase unit.

In another exemplary embodiment of the invention, after step S1607, the memory controller 104 (or the memory management circuit 202) further performs an erasing operation on the first physical erase unit and links the first physical erase unit to the spare area 404.

As described above, in a data storing method, a memory controller, and a memory storage device provided by an exemplary embodiment of the invention, when a power failure occurs, whether a physical program unit programmed during a data merging procedure contains any dancing bit is determined, and if the physical program unit contains a dancing bit, the state before the data merging procedure is performed is resumed, so that the data reliability and accuracy is effectively ensured. Additionally, in the data storing method, the memory controller, and the memory storage device provided by an exemplary embodiment of the invention, whether the programmed physical program unit contains any dancing bit is determined when a system data is written, and if the physical program unit contains a dancing bit, the valid data is moved to another address, so that the reliability and accuracy of the system data is effectively ensured. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data storing method for a rewritable non-volatile memory module, wherein the rewritable non-volatile memory module has a plurality of physical erase units, each of the physical erase units has a plurality of physical program units, and the physical erase units are grouped into at least a system area, the data storing method comprising:
   writing system data into a first physical erase unit in the system area;
   determining whether the first physical erase unit contains a dancing bit; and
   when the first physical erase unit contains the dancing bit, selecting a second physical erase unit among the physical erase units, and writing the system data into the second physical erase unit.

2. The data storing method according to claim 1 further comprising:
   moving valid data in the first physical erase unit into the second physical erase unit.

3. The data storing method according to claim 2 further comprising:
   after moving the valid data in the first physical erase unit into the second physical erase unit, executing an erasing operation on the first physical erase unit.

4. The data storing method according to claim 1, wherein the step of determining whether the first physical erase unit contains the dancing bit comprises:
   determining whether the number of error bits in data stored in a first physical program unit among the physical program units of the first physical erase unit is greater than an error bit number threshold and not greater than a maximum correctable error bit number, wherein the system data is written into the first physical program unit; and
   when the number of error bits in the data stored in the first physical program unit is greater than the error bit number threshold and not greater than the maximum correctable error bit number, determining that the first physical erase unit contains the dancing bit.

5. A memory controller for controlling a rewritable non-volatile memory module, wherein the rewritable non-volatile memory module has a plurality of physical erase units, each of the physical erase units has a plurality of physical program units, the memory controller comprising:
   a host interface configured to couple to a host system;
   a memory interface configured to couple to the rewritable non-volatile memory module; and
   a memory management circuit coupled to the host interface and the memory interface,
   wherein the memory management circuit groups the physical erase units into at least a system area,
   wherein the memory management circuit writes system data into a first physical erase unit in the system area, and determines whether the first physical erase unit contains a dancing bit,
   wherein if the first physical erase unit contains the dancing bit, the memory management circuit selects a second physical erase unit among the physical erase units and writes the system data into the second physical erase unit.

6. The memory controller according to claim 5, wherein the memory management circuit moves valid data in the first physical erase unit into the second physical erase unit.

7. The memory controller according to claim 6, wherein after moving the valid data in the first physical erase unit into the second physical erase unit, the memory management circuit executes an erasing operation on the first physical erase unit.

8. The memory controller according to claim 5, wherein in the operation of determining whether the first physical erase unit contains the dancing bit, the memory management circuit determines whether the number of error bits in data stored in a first physical program unit among the physical program units of the first physical erase unit is greater than an error bit number threshold and not greater than a maximum correctable error bit number, wherein the system data is written into the first physical program unit,
   wherein if the number of error bits in the data stored in the first physical program unit is greater than the error bit number threshold and not greater than the maximum correctable error bit number, the memory management circuit determines that the first physical erase unit contains the dancing bit.

9. A memory storage device, comprising:
   a connector configured to couple to a host system;
   a rewritable non-volatile memory module having a plurality of physical erase units, wherein each of the physical erase units has a plurality of physical program units; and
   a memory controller coupled to the connector and the rewritable non-volatile memory module,
   wherein the memory controller groups the physical erase units into at least a system area,
   wherein the memory controller writes system data into a first physical erase unit in the system area, and determines whether the first physical erase unit contains a dancing bit,
   wherein if the first physical erase unit contains the dancing bit, the memory controller selects a second physical erase unit among the physical erase units and writes the system data into the second physical erase unit.

10. The memory storage device according to claim 9, wherein the memory controller moves valid data in the first physical erase unit into the second physical erase unit.

11. The memory storage device according to claim 10, wherein after moving the valid data in the first physical erase unit into the second physical erase unit, the memory controller executes an erasing operation on the first physical erase unit.

12. The memory storage device according to claim 9, wherein in the operation of determining whether the first physical erase unit contains the dancing bit, the memory controller determines whether the number of error bits in data stored in a first physical program unit among the physical program units of the first physical erase unit is greater than an error bit number threshold and not greater than a maximum correctable error bit number, wherein the system data is written into the first physical program unit,
   wherein if the number of error bits in the data stored in the first physical program unit is greater than the error bit number threshold and not greater than the maximum correctable error bit number, the memory management circuit determines that the first physical erase unit contains the dancing bit.

* * * * *